US006764763B1

(12) United States Patent
Tomihashi et al.

(10) Patent No.: US 6,764,763 B1
(45) Date of Patent: Jul. 20, 2004

(54) WATER-BASED VULCANIZABLE FLUORORUBBER COMPOSITION AND COATED ARTICLE

(75) Inventors: Nobuyuki Tomihashi, Settsu (JP); Koichiro Ogita, Settsu (JP); Kiyotaro Terasaka, Settsu (JP); Yasukazu Nakatani, Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/623,010

(22) PCT Filed: Feb. 24, 1999

(86) PCT No.: PCT/JP99/00825

§ 371 (c)(1),
(2), (4) Date: Aug. 25, 2000

(87) PCT Pub. No.: WO99/43749

PCT Pub. Date: Sep. 2, 1999

(30) Foreign Application Priority Data

Jan. 6, 1998 (JP) .......................................... 10-151130
Feb. 27, 1998 (JP) .......................................... 10-047971

(51) Int. Cl.[7] ......................... G03G 15/20; C08L 27/12; C09D 127/12

(52) U.S. Cl. ....................... 428/375; 428/379; 428/421; 428/906; 524/456

(58) Field of Search ................................ 428/375, 379, 428/421, 906; 524/456

(56) References Cited

U.S. PATENT DOCUMENTS 3,951,913 A * 4/1976 Kometani et al. .......... 525/151
4,339,553 A 7/1982 Yoshimura et al.
4,503,179 A 3/1985 Yoshimura et al.
4,929,686 A * 5/1990 Sonoi et al. ................ 525/279
5,478,902 A * 12/1995 Yamamoto et al. ......... 526/247
5,700,861 A 12/1997 Tomihashi et al.
6,325,752 B1 * 12/2001 Tomihashi et al. .......... 524/436

FOREIGN PATENT DOCUMENTS

EP 0612165 A1 8/1994
EP 0690096 A1 1/1996
EP 1 000 988 A1 5/2000
JP 56147840 A 11/1981
JP 5884216 A 5/1983
JP 5853671 11/1983
JP 6250133 A 3/1987
JP 2248453 A 10/1990
JP 6264021 A 9/1994
JP 1025447 A 1/1998
WO 9807784 2/1998

* cited by examiner

*Primary Examiner*—D. R. Wilson
(74) *Attorney, Agent, or Firm*—Birch, Stewart, Kolasch & Birch, LLP

(57) ABSTRACT

An aqueous fluoroelastomer curable composition comprising an aqueous fluoroelastomer dispersion and a basic polyol curing agent, and an article having a coating film formed from this composition. The aqueous fluoroelastomer curable composition has a long pot life although it is a one-fluid type aqueous dispersion, and forms a cured film having sufficient strength and heat resistance at a relatively low temperature in a short time.

3 Claims, No Drawings

WATER-BASED VULCANIZABLE FLUORORUBBER COMPOSITION AND COATED ARTICLE

This application is the national phase under 35 U.S.C. § 371 of PCT International Application No. PCT/JP99/00825 which has an International filing date of Feb. 24, 1999, which designated the United States of America.

FIELD OF THE INVENTION

The present invention relates to an aqueous fluoroelastomer curable composition and a coated article. In particular, the present invention relates to an aqueous fluoroelastomer curable composition comprising a fluorine-containing copolymer and a specific polyol curing agent, and an article having a coating film formed from such a composition.

BACKGROUND ART

A method for curing an aqueous fluoroelastomer coating composition with a polyamine curing agent is known (see JP-B-58-53671 corresponding to U.S. Pat. No. 4,339,553). In general, the coating film formed by this method has good mechanical properties, but low sealing properties. In addition, when such a coating film is used to coat the surface of a roll used in office automation (OA) equipment (e.g. copying machines, printers, etc.), it has drawbacks such as insufficient elasticity, heat resistance, and so on. When the polyamine curing agent is added to a fluoroelastomer curable composition, for example, a coating composition, its pot life is shortened because of gelling, etc. Accordingly, two or more fluid type compositions are practically supplied, but no practically usable one-fluid type composition is available.

When a fluoroelastomer is cured with a polyol curing agent, it is possible to prepare one-fluid type fluoroelastomer coating compositions containing organic solvents (see PCT/JP97/02853). However, in these years, the VOC regulation and the like become severer and severer, and thus environment friendly aqueous coating compositions are desired. However, one-fluid type aqueous fluoroelastomer coating compositions in the form of an aqueous dispersion containing no organic solvent are not known.

DISCLOSURE OF THE INVENTION

One object of the present invention is to provide a one-fluid type aqueous fluoroelastomer curable composition, which can be formulated as an aqueous dispersion, form a cured film having high strength at a relatively low temperature in a short time, and has a long pot life.

Another object of the present invention is to provide a coated article, which does not suffer from the drawbacks of coated articles having a coating film formed from a conventional aqueous fluoroelastomer coating composition, in particular, rolls for OA equipment.

To achieve these and other objects, the present invention provides an aqueous fluoroelastomer curable composition comprising an aqueous fluoroelastomer dispersion and a basic polyol curing agent, and a coated article at least a part of the surface of which is coated with a coating layer formed from such a composition.

EMBODIMENTS TO CARRY OUT THE INVENTION

Now, the components contained in the composition of the Present invention will be explained.

(A) Aqueous Dispersion of Fluoroelastomer

The aqueous dispersion of a fluoroelastomer is prepared by dispersing a fluorine-containing elastic copolymer in water in a concentration of 10 to 75 wt. % in the presence of a surfactant such as polyoxyethylene, an alkyl phenyl ether, an alkylsulfonate salt, etc.

The fluorine-containing elastic copolymer is a fluorine-containing copolymer comprising repeating units represented by the formula: $—CH_2—$ in the backbone. Typical examples of such a copolymer include fluorine-containing elastic copolymers, comprising vinylidene fluoride, and specific examples of such copolymers are those comprising the following repeating units in the backbone:

at least one repeating unit selected from the group consisting of $—CF_2—CH_2—$, $—CH_2—CH_2—$ and $—CH_2—CH(CH_3)—$ and at least one repeating unit selected from the group consisting of $—CF_2—CF(CF_3)—$, $—CF_2—CF_2—$ and $—CF_2—(ORf)CF—$ in which Rf is a fluoroalkyl group having 1 to 6 carbon atoms.

Specific examples of such copolymers include vinylidene fluoride-hexafluoropropylene copolymers, vinylidene fluoride-tetrafluoroethylene-hexafluoropropylene copolymers, ethylene-hexafluoropropylene copolymers, tetrafluoroethylene-propylene copolymers, etc. Such fluorine-containing elastic copolyers are commercially sold under the trade names of “DAIEL®” (by Daikin Industries Ltd.), “BAITON FLOAM®” (by E. I DuPont), “AFLAS®” (by ASAHI GLASS Co., Ltd.), and so on. Among them, the vinylidene fluoride base copolymers are preferable in view of the crosslinkability.

(B) Basic Polyol Curing Agent

Herein, the basic polyol curing agent means a compound or a polymeric compound having at least two hydroxyl groups, in particular, phenolic hydroxyl groups in the molecule, and the curing ability.

Examples of the polyol curing agent includes salts of a basic compound with a phenol compound of the formula:

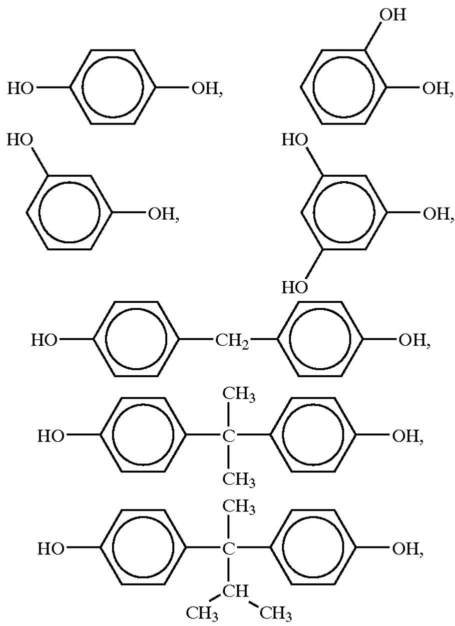

-continued

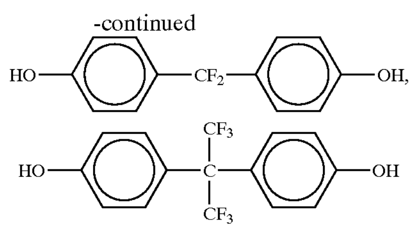

or a phenolic resin of the formula:

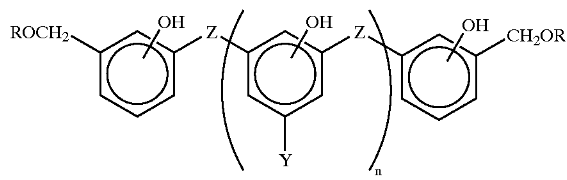

wherein Z is —$CH_2$— or —$CH_2OCH_2$—, Y is a hydrogen atom, a halogen atom, or a group of the formula: —R, —$CH_2OR$ or —OR in which R is an alkyl group having 1 to 4 carbon atoms, and n is an integer of 0 to 100.

Examples of the basic compound include ammonium, phosphonium, alkali metals (e.g. lithium, sodium, potassium, etc.), alkaline earth metals (e.g. beryllium, magnesium, calcium, barium, etc.), and so on.

Among them, the salts of hydroquinone, bisphenol A, bisphenol AF, resol type phenolic resins, etc. are preferable in view of the properties of the coating films.

As a curing agent, a combination of the above basic polyol and other polyol may be used.

(C) Curing Accelerator

The composition of the present invention may contain the following compound as an optional curing accelerator:

Quaternary Ammonium Salt

A quaternary ammonium salt of the formula:

$$NR_4X \text{ or } R_3N—R'—NR_3.2X$$

wherein X is an acid residue or a hydroxyl group, R groups are the same or different and each an alkyl group having 1 to 20 carbon atoms, an halogenated alkyl group having 1 to 20 carbon atoms or an aryl group having 6 to 20 carbon atoms, or two or more R groups together form a carbon ring or a heterocyclic group, and R' is an alkylene group having 2 to 21 carbon atoms or a phenylenedialkylene group having 8 to 12 carbon atoms.

Examples of the acid residue include halide, sulfate, sulfite, bisulfite, thiosulfate, sulfide, polysulfide, hydrogen sulfide, thiocyanate, carbonate, bicarbonate, nitrate, carboxylate, borate, phosphate, biphosphate, phosphite, perchlorate, bifluoride, arsenate, ferricyanide, ferrocyanide, molybdate, selenate, selenite, uranate, tungstate, etc.

Specific examples of the quaternary ammonium salt include quaternary alkyl- and aralkyl-ammonium salts (e.g. trimethylbenzylammonium chloride, triethylbenzylammonium chloride, dimethyldecylbenzylammonium chloride, triethylbenzylammonium chloride, myristylbenzyldimethylammonium chloride, dodecyltrimethylammonium chloride, dimethyltetradecylbenzylammonium chlroride, trimethyltetradecylammonium chloride, coconuttrimethylammonium chloride, stearyltrimethylammonium chloride, distearyldimethylammonium chloride, tetrabutylammonium hydroxide, 1,4-phenylenedimethylenebistrimethylammonium dichloride, 1,4-phenylenedimethylenebistriethylammonium dichloride, ethylenebistriethylammonium dibromide, etc.), quaternary 1,8-diaza-bicyclo[5.4.0]-7-undecenium salts (e.g. 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0]-7-undecenium methylsulfate, 8-methyl-1,8-diaza-bicyclo[5.4.0]-7-undecenium bromide, 8-propyl-1,8-diaza-bicyclo[5.4.0]-7-undecenium bromide, 8-dodecyl-1,8-diaza-bicyclo[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7-undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenetyl-1,8-diaza-bicyclo[5.4.0]-7-undecenium chloride, 8-(3-phenylpropyl)-1,8-diaza-bicyclo[5.4.0]-7-undecenium chloride, etc.), and the like.

Furthermore, as curing accelerators, salts of the following tertiary amines with inorganic or organic acids can be used:

Tertiary Amine

A tertiary amine of the formula:

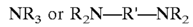

wherein R groups are the same or different and each is an alkyl or alkenyl group having 1 to 20 carbon atoms, or an aryl group having 6 to 20 carbon atoms, or two or more R groups together form a carbon ring or a heterocyclic group, and R' is an alkylene group having 2 to 21 carbon atoms or a phenylenedialkylene group having 8 to 12 carbon atoms.

Specific examples of the tertiary amines include trimethylamine, triethylamine, tri-n-propylamine, tri-n-butylamine, triisobutylamine, methyldiethylamine, dimethylethylamine, dimethyl-n-propylamine, dimethyl-n-butylamine, dimethylisobutylamine, dimethylisopropylamine, dimethyl-sec.-butylamine, dimethyl-tert.-butylamine, triallylamine, diallylmethylamine, allyldimethylamine, benzyldimethylamine, benzyldiethylemine, N-allylpiperidine, N-ethylpiperidine, N-butylpiperizine, N-methylpyrrolidine, N-cyclohexylpyrrolidine, N-n-butylpyrrolidine, N-ethylpyrrolidine, N-benzylpyrrolidine, 2,4,6-trimethylpyridine, etc.

Examples of the inorganic or organic acids which form the salts include HCl, HBr, HF, $(C_2H_5)_3NH^+Cl^-$, $(C_2H_5)_3NH^+NO^{3-}$, $2(C_2H_5)_3NH^+SO_4^{2-}$, $2(C_2H_5)_3NH^+CO_3^{2-}$, $(C_2H_5)_3NH^+RO^-$, $(C_2H_5)_3NH^+RCOO^-$, $(C_4H_9)_3NH^+Cl^-$, $(C_4H_9)_3NH^+NO_3^-$, $2(C_4H_9)_3NH^+SO_4^{2-}$, $2(C_4H_9)_3NH^+CO_3^{2-}$, $(C_4H_9)_3NH^+RO^-$, $(C_4H_9)_3NH^+RCOO^-$ wherein R is an alkyl or alkenyl group having 1 to 20 atoms or an aryl group having 6 to 20 carbon atoms.

Primary or secondary amines are not preferable since they induce reactions other than the polyol curing. Amines having pKa of less than 8 are not preferable, since they achieve the low curing rate and thus the coating film has low strength.

In the present invention, an organic acid may be added to the composition to improve the shelf stability of the composition. As the organic acid, one having 1 to 12 carbon atoms, preferably 1 to 4 carbon atoms is used. Among them, those having 9 or more carbon atoms are less preferable since they remain in the coating film formed from the composition. Preferred organic acids are monocarboxylic acids such as formic acid, acetic acid, propionic acid, etc. and dicarboxylic acids such as oxalic acid, malonic acid, succinic acid, etc.

The organic acids suppress the polyol curing of the fluorine-containing copolymer contained in the composition during the storage. When the composition is coated, dried and baked, the organic acid is evaporated or thermally decomposed, the basic compound accelerates the curing reaction. Thus, the organic acid is categorized into "curing accelerators" in the present invention.

The compounded amounts of the components in the composition according to the present invention are as follows:

The basic polyol curing agent is used in an amount of 0.1 to 10 wt. parts, preferably 0.5 to 5 wt. parts, and the curing accelerator is used in an amount of 0 to 10 wt. parts, preferably 0.01 to 5 wt. parts, all based on 100 wt. parts of the fluorine-containing copolymer.

When the amount of the curing accelerator is less than the above lower limit, it may be difficult to cure the copolymer. When the amount of the curing accelerator exceeds the above upper limit, it may be difficult to control the curing.

In addition to the polyol curing agent and the curing accelerator, the composition of the present invention may contain various additives which are usually added to the fluoroelastomer compositions, for example, fillers, colorants, acid-acceptors, etc.

Examples of the filler include carbon black, white carbon, calcium carbonate, barium sulfate, etc., and examples of the colorant include inorganic pigments, mixed oxide pigments, etc.

Examples of the acid-acceptor include magnesium oxide, lead oxide, zinc oxide, lead carbonate, zinc carbonate, and complex salts such as hydrotalcite. Acid-acceptors having a high activity such as calcium hydroxide are less preferable since the composition tends to gel. Acid-acceptors having lower pKa than that of the above basic compounds are preferable. When the acid-acceptors have high pKa, the composition tends to gel. In general, the acid-acceptor is used in an amount of 1 to 40 wt. parts per 100 wt. parts of the fluorine-containing copolymer in accordance with the activity of the acid-acceptor.

Furthermore, the composition of the present invention may contain 5 to 900 wt. parts of a fluororesin or a terminal-modified perfluoropolyether (a perfluoropolyether compound having a terminal functional group reactive with the fluorine-containing copolymer such as $—NH_2$, $—CH_2OH$, etc.) per 100 wt. parts of the fluorine-containing copolymer. Thereby, the non-stick property can be imparted to the coating film formed from the composition.

Examples of the fluororesin include polyvinylidene fluoride (PVdF), ethylene-tetrafluoroethylene copolymers (ETFE), polychlorotrifluoroethylene (CTFE), tetrafluoroethylene-hexafluoropropylene-perfluoroalkyl vinyl ether copolymer (EPA), tetrafluoroethylene-hexafluoropropylene copolymers (FEP), tetrafluoroethylene-perfluoroalkyl vinyl ether (PFA), polytetrafluoroethylene (PTFE), etc. Among them, tetrafluoroethylene base copolymers are preferable in view of the non-stick property. The fluororesins are preferably used in the form of an aqueous dispersion in view of the dispersibility.

The composition of the present invention can be applied and cured in the same manners as those used to apply and cure the conventional curable compositions of the fluorine-containing copolymers. That is, according to the properties of the compositions, they are applied to an article to be coated by brush coating, spray coating, dip coating, flow coating, dispenser coating, screen coating, etc., and sufficiently dried, followed by baking at a temperature of 150 to 300° C. for 10 to 120 minutes.

The surface of the article to be coated is preferably defatted or washed. It is also preferable to form a primer layer on the surface of the article to be coated to improve the adhesion of the composition to the article. Examples of the primer include silane primers, silicone primers, etc.

A surface layer may be formed on the coating film formed from the composition of the present invention. The surface layer can be formed from the above fluororesins and/or the terminal-modified perfluoropolyethers by conventional methods.

The curable composition of the fluorine-containing elastic copolymer according to the present invention is characterized in that it has better shelf stability than an aqueous composition curable with a polyamine curing agent, although the composition of the present invention is a one-fluid type aqueous dispersion. Furthermore, the composition of the present invention can contain the solid of the fluorine-containing copolymer at a higher concentration than the solvent-based polyol-curing composition.

Examples of articles or substrates to be coated with the composition of the present invention are as follows:

metals (e.g. iron, stainless steel, copper, aluminum, brass, etc.), glass products (e.g. glass plates, woven and non-woven fabric of glass fiber, etc.), molded articles or coated articles of general resins or heat-resistant resins (e.g. polypropylene, polyoxymethylene, polyimide, polyamideimide, polysulfone, polyethersulfone, polyether ether ketone, etc.), molded articles or coated articles of general rubbers (e.g. styrene-butadiene rubber (SBR), isobutylene-isoprene rubber, nitrile-butadiene rubber (NBR), etyrene-propylene rubber (EPDM), etc.) and heat-resistant rubbers (e.g. silicone rubber, fluoroelastomer, etc.), woven and non-woven fabric of natural and synthetic fibers, and the like.

The coating layers formed from the composition of the present invention can be used in various fields which require heat resistance, solvent resistance, lubrication and/or non-stick properties. Specific examples of the applications include rolls (e.g. fixing rolls, press rolls, etc.) and conveying belts for OA equipment such as copying machines, printers, facsimiles, etc.; sheets and belts; O-rings, diaphragms, chemical-resistant tubes, fuel hoses, valve seals, gaskets for chemical plants, engine gaskets, and the like.

EXAMPLES

The present invention will be illustrated by the following examples.

Example 1

Preparation of Pigment Paste A

A filler (MT carbon black) (20 wt. parts) and an acid-acceptor (MA-150 manufactured by KYOWA CHEMICAL INDUSTRIES, Ltd.; main component: MgO) (3 wt. parts) were dispersed in pure water (48 wt. parts) together with a surfactant (HS-208 manufactured by NFO Corporation; 20% aqueous solution; main component: $C_8CH_{17}$-p-Ph—O—$(CH_2CH_2O)_n$—OH (n=8)) (2 wt. parts) to obtain a paste, which is referred to as "Pigment Paste A".

Preparation of Coating Composition

Pigment Paste A (73 wt. parts) and a surfactant (ADEKANOL UH-140S manufactured by ASAHI DENKA KOGYO Co., Ltd.; main component: polymeric nonionic surfactant) (1.5 wt. parts) were added to the dispersion of a fluoroelastomer (DAIEL G-501 AN manufactured by Daikin Industries Ltd.; vinylidene fluoride-tetrafluoroethylene-hexafluoropropylene copolymer) (100 wt. parts of the solid component), and well dispersed. Then, to this aqueous dispersion, the sodium salt of bisphenol AF (2.2 wt. parts) as a basic polyol curing agent and the octylate salt of DBU (1,8-diaza-bicyclo[5.4.0]-7-undecene) (U-CAT SA102 manufactured by SAN-APRO Co., Ltd.) (0.5 wt. part) as a curing accelerator were added to obtain a coating composition.

With the obtained coating composition, the stability of the composition and the mechanical property of the coating film were measured by the following methods:

Stability

The coating composition was poured in a polyethylene bottle and kept standing at 25° C. After 2 days, 7 days, 2 weeks, 1 month and 2 months, the state of the coating composition was observed.

Mechanical Properties

The coating composition was poured in a metal vat and dried at room temperature for 5 days and then at a temperature of 80 to 100° C. for 2 days, followed by baking at 200° C. for 60 minutes. The formed film was peeled off from the vat. Then, a JIS No. 5 dumbbell-shaped sample was punched out from the film and subjected to the tensile test at a pulling rate of 500 mm/min.

Example 2

A coating composition was prepared in the same manner as in Example 1 except that sodium salt of hydroquinone was used in place of the sodium salt of bisphenol AF.

Example 3

A coating composition was prepared in the same manner as in Example 1 except that a phenolic resin soluble in an alkaline water (DKK-1 manufactured by ASAHI ORGANIC MATERIAL INDUSTRIES, Ltd.) was used in place of the sodium salt of bisphenol AF.

Example 4

A coating composition was prepared in the same manner as in Example 1 except that DAIEL G-701 BP dispersion (manufactured by Daikin Industries Ltd.; vinylidene fluoride-hexafluoropropylene copolymer dispersion) was used in place of the DAIEL G-501 AN dispersion.

Example 5

A coating composition was prepared in the same manner as in Example 1 except that DAIEL G-701 BP dispersion (manufactured by Daikin Industries Ltd.; vinylidene fluoride-hexafluoropropylene copolymer dispersion) was used in place of the DAIEL G-501 AN dispersion, and sodium salt of hydroquinone was used in place of the sodium salt of bisphenol AF.

Example 6

A coating composition was prepared in the same manner as in Example 1 except that DAIEL G-701 BP dispersion, (manufactured by Daikin Industries Ltd.; the dispersion of vinylidene fluoride-hexafluoropropylene copolymer) was used in place of the DAIEL G-501 AN dispersion, and a phenolic resin soluble in an alkaline water (DKK-1 manufactured by ASAHI ORGANIC MATERIAL INDUSTRIES, Ltd.) was used in place of the sodium salt of bisphenol AF.

Comparative Example 1

A coating composition was prepared in the same manner as in Example 1 except that bisphenol A was used in place of the sodium salt of bisphenol AF.

Comparative Example 2

A coating composition was prepared in the same manner as in Example 1 except that a polyamine curing agent (EPOMATE F-100 manufactured by YUKA SHELL Co., Ltd.) (2 wt. parts) and a silane coupling agent (A-1100 manufactured by Nippon Unicar Co., Ltd.) (9 wt. parts) were used in place of the polyol curing agent and the curing accelerator, respectively, and pure water (7.5 wt. parts) was used.

The compositions and the results of the experiments in Examples 1–6 and Comparative Examples 1–2 are summarized in Table 1.

TABLE 1

| Component (wt. %) | Ex. 1 | Ex. 2 | Ex. 3 | Ex. 4 | Ex. 5 | Ex. 6 | C. Ex. 1 | C. Ex. 2 |
|---|---|---|---|---|---|---|---|---|
| Flouroelastomer dispersion: | | | | | | | | |
| DAIEL G-501AN | 100 | 100 | 100 | | | | 100 | 100 |
| DAIEL G-701BP | | | | 100 | 100 | 100 | | |
| Filler: MI-carbon black | 20 | 20 | 20 | 20 | 20 | 20 | 20 | 20 |
| Acid-acceptor: MA-150 | 3 | 3 | 3 | 3 | 3 | 3 | 3 | 3 |
| Surfactant: ADEKANOL UH-140S | 1.5 | 1.5 | 1.5 | 1.5 | 1.5 | 1.5 | 1.5 | 1.5 |
| Polyol curing agent: | | | | | | | | |
| Na Salt of bisphenol AF | 2.2 | | | 2.2 | | | | — |
| Na salt of hydroquinone | | 2.2 | | | 2.2 | | | — |
| DKK-1* | | | 2.2 | | | 2.2 | | — |
| Bisphenol A | | | | | | | 2.2 | — |
| Curing accelerator: SA-102 | 0.5 | 0.5 | 0.5 | 0.5 | 0.5 | 0.5 | 0.5 | — |
| Polyamine curing agent: Epomate E-100 | — | — | — | — | — | — | — | 2 |
| Silane coupling agent: A-1100 | — | — | — | — | — | — | — | 9 |
| Stability | Gelled after 7 days | No change after 3 months | Gelled after 2 weeks | Gelled after 7 days | No change after 3 months | No change after 3 months | Immediately gelled | Gelled in 2 days |
| 100% Modulus (kgf/cm$^2$) | 13 | 14 | 20 | 15 | 12 | 23 | — | 69 |
| Tensile strength (kgf/cm$^2$) | 67 | 57 | 68 | 43 | 40 | 69 | — | 110 |
| Elongation (%) | 590 | 820 | 780 | 570 | 1000 | 740 | — | 240 |

*Phenolic resin soluble in alkaline water.

Example 7

With the coating film formed from a coating composition, which was prepared in the same manner as in Example 3, the adhesion property, non-stick property and tensile property was measured as follows:

Adhesion Properties

The coating composition was spray coated on a substrate, well dried at 80 to 100° C. and baked at 200° C. for 60 minutes.

On the surface of the coating film, crosshatches (100 squares) were formed according to JIS K 5400-1990, 8.5.2, and an adhesive tape (manufactured by NICHIBAN) was closely adhered to the cross-hatched surface, and immediately peeled off. Using fresh adhesive tapes, the peeling was repeated 10 times, and the number of the remaining squares was counted.

As the substrates, an aluminum plate (A-1050), a polyimide film, a silicone rubber sheet and a fluoroelastomer sheet were used.

The aluminum plate was beforehand sand blasted, and coated with a silane compound (LORD Chemlok Y-4310; 10 wt. % aqueous solution) as a primer. The silicone rubber sheet was also coated with GLP-103SR (manufactured by Daikin Industries Ltd.; main component: silicone resin) as a primer.

Non-Stick Property

On the surface of the coating film, which was prepared in the same manner as in the test of the adhesion properties, one drop of pure water or n-cetane was dropped, and a contact angle was measured with a goniometer (manufactured by KYOWA KAIMEN KAGAKU KABUSHIKIKAISHA).

Mechanical Property

The mechanical property was measured in the same manner as in Example 1.

Example 8

The adhesion properties, non-stick property and mechanical property was measured in the same manner as in Example 7 except that a coating composition, which was prepared in the same manner as in Example 6, was used.

Comparative Example 3

The adhesion properties, non-stick property and mechanical property was measured in the same manner as in Example 7 except that a coating composition, which was prepared in the same manner as in Comparative Example 1, was used.

Comparative Example 4

The adhesion properties, non-stick property and mechanical property was measured in the same manner as in Example 7 except that a solvent-based polyol curable fluoroelastomer coating composition (a vinylidene fluoride-hexafluoropropylene copolymer base coating composition manufactured by Daikin Industries Ltd.) was used as a coating composition, and the coating composition was coated on the substrate with a bar coater to form the coating film for the measurement of the adhesion properties and non-stick property.

Example 9

Preparation of Pigment Paste B

A filler (TALOX R-516L manufactured by TITANIUM INDUSTRIES, Ltd.; main component: $Fe_2O_3$) (3 wt. parts) and an acid-acceptor (MA-150 manufactured by KYOWA CHEMICAL INDUSTRIES, Ltd.) (3 wt. parts) were dispersed in pure water (43 wt. parts) together with a surfactant (HS-208 manufactured by NFO Corporation; 20% aqueous solution) (2 wt. parts) to obtain a paste, which is referred to as "Pigment Paste B".

Preparation of Coating Composition

Pigment Paste B (51 wt. parts) and a surfactant (ADEKANOL UH-140S manufactured by ASAHI DENKA KOGYO Co., Ltd.) (3.5 wt. parts) were added to the dispersion of a fluoroelastomer (DAIEL G-501 AN manufactured by- Daikin Industries Ltd.; vinylidene fluoride-tetrafluoroethylene-hexafluoropropylene copolymer) (100 wt. parts of the solid component), and a FEP dispersion (manufactured by Daikin Industries Ltd.; solid content: 52 wt. %) (192 wt. parts) and a surfactant (NONION DS-60HN manufactured by NFO Corporation) were added, and the mixture was well dispersed. Then, to this aqueous dispersion, an alkaline water-soluble phenolic resin (DKK-1) (2.2 wt. parts) as a basic polyol curing agent and the octylate salt of DBU (1,8-diaza-bicyclo-[5.4.0]-7-undecene) (U-CAT SA102 manufactured by SAN-APRO Co., Ltd.) (0.5 wt. part) as a curing accelerator were added to obtain a coating composition.

With a coating film formed from the obtained coating composition, the adhesion properties, non-stick property and mechanical property was measured as follows:

Adhesion Properties and Non-Stick Property

The coating composition was spray coated on a substrate, well dried at 80 to 100° C. and baked at 300° C. for 15 minutes. Then, the adhesion properties and non-stick property was measured in the same manners as those described in Example 7.

Mechanical Property

The coating composition was spray coated on an aluminum foil, well dried at 80 to 100° C. and baked at 300° C. for 15 minutes. The aluminum foil was dissolved with hydrochloric acid. Then, a JIS No. 4 dumbbell-shaped sample was punched out from the film and subjected to the tensile test at a pulling rate of 500 mm/min.

Example 10

A coating composition was prepared in the same manner as in Example 9 except that DAIEL G-701 BP dispersion was used in place of DAIEL G-501 AN dispersion, and the adhesion properties, non-stick property and mechanical property of the coating film were measured.

Comparative Example 5

The procedures of Example 9 were repeated except that a FEP-added aqeueous polyamine curable fluoroelastomer coating (a vinylidene fluoride-tetrafluoroethylene-hexafluoropropylene copolymer base coating composition; ratio of fluoroelastomer to fluororesin (solid content)=1:1) cured with the diamine agent to obtain a coating composition, and the adhesion properties, non-stick property and mechanical property of the coating film were measured.

Example 11

The coating composition prepared in Example 9 was spray coated on the substrate and well dried at 80 to 100° C. Then, a FEP powder coating (manufactured by Daikin Industries Ltd.) was coated on the dried film and then baked at 300° C. for 15 hours. The adhesion properties and non-stick property of the coating film were measured in the same manners as in Example 9.

The results of the measurements in Examples 9–11 and Comparative examples 3–5 are summarized in Table 2.

TABLE 2

| Properties | Ex. 7 | Ex. 8 | C.E. 3 | C.Ex. 4 | Ex. 9 | Ex. 10 | C.Ex. 5 | Ex. 11 |
|---|---|---|---|---|---|---|---|---|
| Adhesion properties (crosshatch test) Substrate: | | | | | | | | |
| Aluminum | 100/100 | 100/100 | 100/100 | 100/100 | 100/100 | 100/100 | 100/100 | 100/100 |
| Polyimide | 100/100 | 100/100 | 100/100 | 100/100 | 100/100 | 100/100 | 100/100 | 100/100 |
| Silicone rubber | 100/100 | 100/100 | 100/100 | 100/100 | 100/100 | 100/100 | 100/100 | 100/100 |
| Flurorubber | 100/100 | 100/100 | 100/100 | 100/100 | 100/100 | 100/100 | 100/100 | 100/100 |
| Non-stick property (contact angle) | | | | | | | | |
| Pure water | 95 | 97 | 93 | 96 | 105 | 106 | 104 | 106 |
| n-Cetane | 40 | 44 | 39 | 41 | 55 | 55 | 51 | 55 |
| Mechanical properties | | | | | | | | |
| 100% Modulus ($kgf/cm^2$) | 20 | 23 | 69 | 40 | 55 | 60 | 120 | — |
| Tensile strength ($kgf/cm^2$) | 60 | 69 | 110 | 90 | 85 | 85 | 140 | — |
| Elongation (%) | 780 | 740 | 240 | 290 | 320 | 290 | 210 | — |

What is claimed is:

1. An article wherein at least a part of the surface of said article is coated with a coating layer formed from an aqueous fluoroelastomer curable coating composition;

wherein said coating composition comprises an aqueous fluoroelastomer dispersion, a basic salt of a compound containing at least two phenolic hydroxyl groups as a curing agent, and a curing accelerator selected from the group consisting of salts of tertiary amines of the formula $NR_3$ with inorganic or organic acids and salts of tertiary amines of the formula $R_2N$—R'—$NR_2$ with inorganic or organic acids, wherein each of said R groups is the same or different from each other and each is an alkyl or alkenyl group having 1 to 20 carbon atoms, or an aryl group having 6 to 20 carbon atoms, or two or more R groups together form a carbon ring or a heterocyclic group, and R' is an alkylene group having 2 to 21 carbon atoms or a phenylenedialkylene group having 8 to 12 carbon atoms;

wherein said aqueous fluoroelastomer dispersion in said coating composition comprises a fluorine-containing elastic copolymer having repeating units represented by the formula: —$CH_2$— in the backbone.

2. The article according to claim 1, wherein said article is a roll for office automation equipment.

3. A process for coating at least a part of a surface of an article comprising the steps of:

applying an aqueous fluoroelastomer curable coating composition of claim 1 on said at least a part of a surface of an article and curing said fluoroelastomer.

* * * * *